April 24, 1962  W. M. ZOLEZZI ET AL  3,031,310
BONELESS STUFFED CHICKEN LEGS
Filed March 8, 1960  2 Sheets-Sheet 1
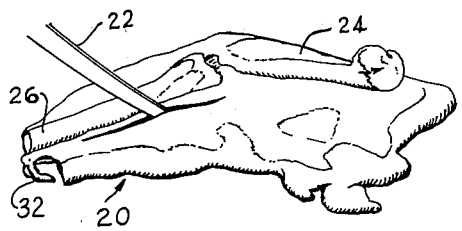
Fig_1
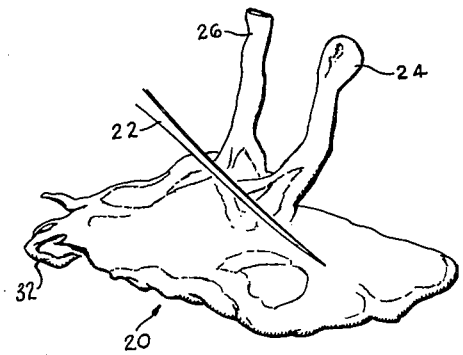
Fig_2
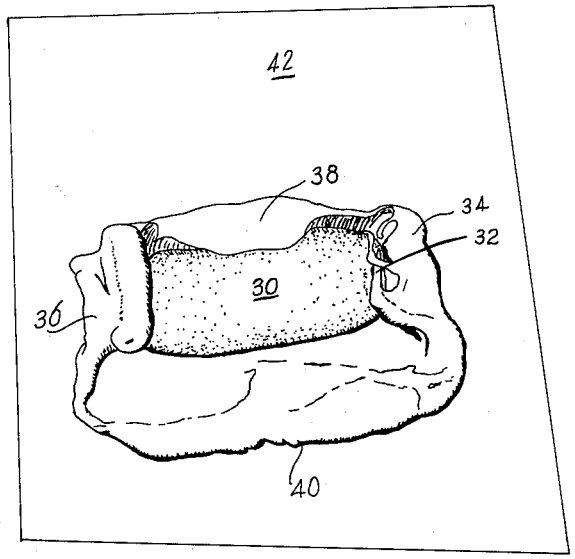
Fig_3
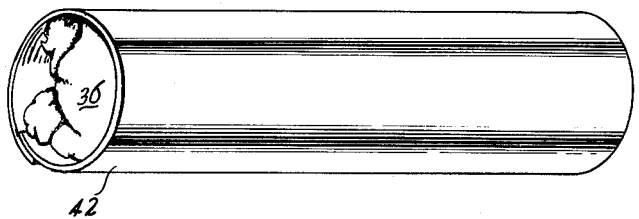
Fig_4
INVENTOR.
WALTER M. ZOLEZZI
MILTON L. BRANDT
BY
Eckhoff and Slick
ATTORNEYS

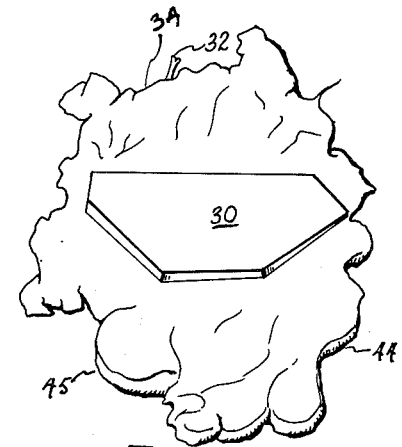
Fig_5
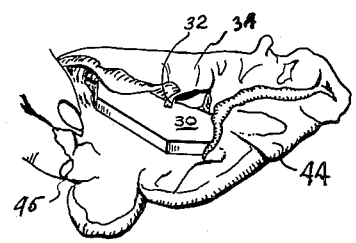
Fig_6
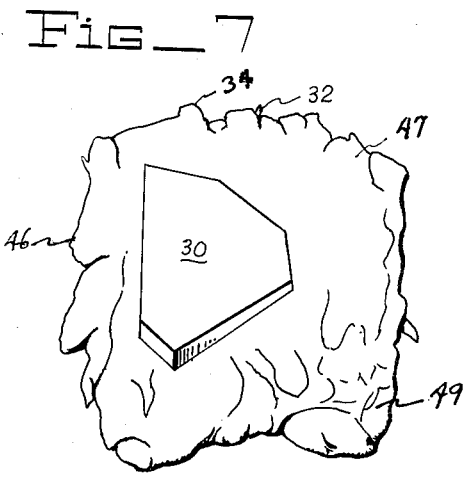
Fig_7
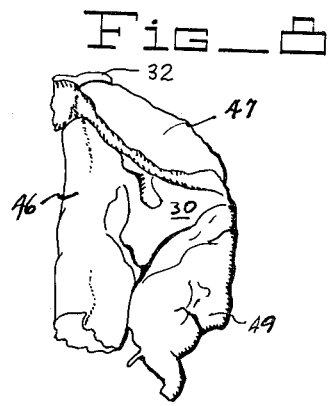
Fig_8
Fig_9
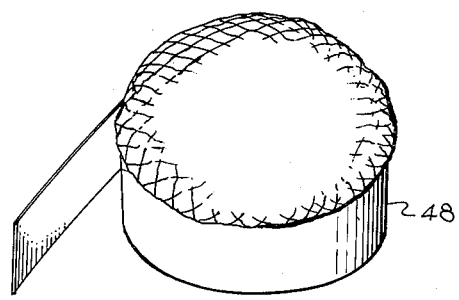
Fig_10
INVENTOR.
WALTER M. ZOLEZZI
MILTON L. BRANDT
BY Eckhoff and Slick
ATTORNEYS

United States Patent Office 3,031,310
Patented Apr. 24, 1962

3,031,310
BONELESS STUFFED CHICKEN LEGS
Walter M. Zolezzi, San Francisco, and Milton L. Brandt, San Mateo, Calif., assignors to O'Brien, Spotorno, Mitchell & Compagno Bros., Inc., a corporation of California
Filed Mar. 8, 1960, Ser. No. 13,491
5 Claims. (Cl. 99—174)

This invention relates in general to the preparation of a stuffed meat product from a whole leg of chicken and more particularly to a method of boning a whole leg of chicken and manipulating the meat obtained therefrom so as to form a self-sustaining product.

It is an object of this invention to provide a method for forming a stuffed meat product, which method is readily carried out to form a self-sustaining product.

In the drawings:

FIGURES 1 and 2 show two stages in the removal of the leg bones from the surrounding muscle tissue;

FIGURES 3 and 4 show two stages in one alternative stuffing method;

FIGURES 5 and 6 show two stages in an alternative stuffing operation;

FIGURES 7 and 8 show two stages in another alternative stuffing operation;

FIGURES 9 and 10 show two stages in still another alternative stuffing operation.

Generally, this invention comprises a method for preparing a stuffed product from a whole chicken leg comprising cutting along the entire length of the medial side of the femur and tibia whereby to partially separate the tissue therefrom and thereafter cutting entirely about the bones to completely free the tissue except in the patellar region; gripping the femur and tibia and bringing them together so that they almost parallel one another while stretching the muscle tissues attached thereto and severing the meat from the bones in the patellar region completely removing all cartilaginous and fibrous tissue, whereby to form a slab of contiguous drumstick and thigh meat with a hole at the center thereof; thereafter, the meat is arranged on a flat surface so that the hole is closed and a stuffing material is placed thereover, one of several wrapping methods then being employed to yield a finished product which is either cylindrical, triangular or round.

Referring now to the drawings wherein like characters refer to like parts throughout, there is shown in FIGURE 1 an entire chicken leg, generally 20, which is in the process of being boned. The boning operation is carried out on the medial side. The operator runs a knife 22 along the bone starting with the upper part of the femur 24 down to the distal extremity of the tibia 26 on both sides, freeing the muscle tissue from the bone except in the region of the patellar (the fibula is left in place on the tibia). The muscle tissue is stretched away from the patellar region and firmly held in the operator's hand as she bones the muscle tissue from the anterior patellar area, completely removing all cartilaginous and fibrous tissue. Note FIGURE 2.

The muscle tissue, removed from the bones in the manner aforementioned, is placed before the operator, who dips a standard meat tenderizing hammer weighing about 1½ pounds and having a waffle-type aluminum head into water and pounds the boneless chicken leg in such a fashion as to increase the area covered. The operator pounds first the center of the boneless leg at the point where the thigh meat and drumstick meat join. Gradually, the hammer, is moved into the drumstick meat or the thigh meat until the outer edge of that side of the boneless leg is reached and that entire slide of the boneless leg has been adequately stretched. The operator repeats with the alternate side of the boneless leg.

Irrespective of the size of the boneless legs at the outset, the area covered by the meat will be increased between 40 and 65 percent by this operation. For example, a boneless chicken leg between 7 and 8 inches long, 3¾ to 4 inches wide and having a thickness of $^{16}/_{32}$ inch at its thickest point will be increased in size to 7½ to 8½ inches long, 5 to 5½ inches wide and will have its maximum thickness decreased to about $^{8}/_{32}$ inch. This requires somewhere in the vicinity of 25–30 blows.

The next step is the stuffing operation. FIGURES 3–10 show alternative procedures. All such operations allow for the stuffing being in contact with virtually 100% of the medial side of both the boneless drumstick and the boneless thigh areas, thus providing means for securing the dressing consistently inside the entire chicken leg during and after cooking.

In each of the operations, the stuffing material 30 is placed at the center of the tissue. In FIGURE 3, a stuffing material consisting primarily of rice is shown. In FIGURES 5–8, cheese is shown, while in FIGURE 9, a dressing is shown.

The assembly method of FIGURES 3 and 4 involves placing a generally cylindrical stuffing material at the center of the tissue with the tendons 32 adjacent one end 34 of the stuffing. The end 34 and the end opposite thereto, 36, are then folded about the generally cylindrical stuffing material and the longitudinal edges 38 and 40 are wrapped about the stuffing material. The kraft paper, 42, impregnated with oil, hereinafter referred to as "oil paper," is then wrapped about the product in a cylindrical fashion so as to achieve the appearance of FIGURE 4.

FIGURES 5–8 show a means of achieving a generally triangular stuffed, boned chicken leg. Where the triangular shape is desirable, the wrapping method employed therewith eliminates the leaking from the leg of those types of stuffing which will liquify under heat, for example, cheese.

In the method variation shown in FIGURES 5 and 6, the triangular stuffing material is placed so that its long edge runs perpendicularly to the tendons 32 on the drumstick end 34. The hole formed at the patellar area is directly beneath the numeral 30 in FIGURE 5, the meat having been pulled together in this area so that the hole is closed. With the longest straight edge of the cheese lying parallel to the edge of the boneless drumstick end, the portion 34 of the meat containing the tendons is folded over the cheese. One of the thigh flaps 44 is then folded over the cheese also and, to some extent, superimposed upon the boneless drumstick meat. Thereafter, the other thigh flap 45 is folded over so as to completely cover the stuffing material.

As seen in FIGURE 6, both flaps 44 and 45 are folded at roughly 45° angles relative to the drumstick meat.

In the variation shown in FIGURES 7 and 8, the long edge of the cheese stuffing is allowed to parallel the tendons 32 and the longitudinal edge 46. The edge 46 is folded over the cheese 30 and flap 47 folded over as shown in FIGURE 8. Then flap 49 is folded over to enclose the stuffing entirely; it is shown partially folded into place in FIGURE 8.

In the last wrapping variation shown in FIGURES 9 and 10, the stuffing material, shown in the form of a ball here, is placed at the center of the boneless drumstick and boneless thigh meat, which is then wrapped entirely around the stuffing material. Finally, the operator wraps a strip of oil paper 48 thereabout. In FIGURE 10, the product has been inverted.

The products shown in FIGURES 4 and 10 incorporated oil paper as a means of maintaining the product in the proper shape during freezing and cooking. Ordinarily, it is the "skin-on" product which would be prepared in this fashion. Where the product is to be breaded, thus to provide means for maintaining the proper product shape during cooking, the product shown in FIGURES 6 and 8 (which omits the oil paper) may be prepared. Of course, breading and the oil paper may be used more or less interchangeably, if desired, though obviously the "skin-on" product is more amenable to the one type of finishing while the "skin-off" product is especially designed as a product to be breaded.

After being formed in the fashion set forth earlier, the stuffed boneless leg may be cooked or frozen.

The products described above may be either skin-on or skin-off products, as desired.

Obviously, many modifications and variations may be made without departing from the spirit and scope of the invention, and therefore only such limitations should be imposed as are indicated in the appended claims.

We claim:

1. A method of preparing a stuffed product from a whole leg of chicken comprising: cutting along the entire length of the medial side of the femur and tibia bones whereby to free said bones from the tissue along the said line; cutting on either side of said tibia and femur whereby to free the tissue secured thereto while retaining the tissue attached thereto in the patellar region; bringing the femur and tibia into close juxtaposition generally parallel to one another and stretching the muscle tissue away from the patellar region while cutting thereabout whereby to free the said femur and tibia from the said tissue and completely removing all cartilaginous and fibrous tissue; pounding the boneless tissue so formed whereby to extend its area; drawing the meat together in the patellar region whereby to fill the hole formed therein; placing a stuffing material at the center of the pounded tissue; and wrapping the said tissue about the said stuffing material.

2. The process of claim 1 wherein the stuffing is a generally cylindrical body, wherein the tissues are wrapped about the generally cylindrical stuffing to form a generally cylindrical body and wherein the entire cylindrical body is thereafter wrapped in paper impregnated with oil.

3. The method of claim 1 wherein the stuffing is a generally triangular food body having one long side and two shorter sides, the said long side being placed adjacent the drumstick meat, the drumstick meat being folded thereover and flaps of the thigh meat being folded thereover at roughly 45° angles relative to said drumstick meat whereby to form a generally triangular product.

4. The method of claim 1 wherein the stuffing material is a generally triangular food body having one long side and two shorter sides, wherein said long side is positioned along a longitudinal edge of the tissue so formed, one short edge being adjacent the drumstick meat and one adjacent the thigh meat, with the said long side running parallel to the drumstick tendons and wherein the one longitudinal edge is folded over the said long side and wherein thigh and drumstick flaps are thereafter folded over the said short sides whereby to form a triangular product.

5. The method of claim 1 wherein the stuffing material is generally in the shape of a ball which is placed in the center of the pounded meat so formed and wrapped thereabout, and wherein a strip of paper impregnated with oil is wrapped about the product so formed whereby to secure the said tissue in place.

References Cited in the file of this patent

UNITED STATES PATENTS

| | | |
|---|---|---|
| 1,058,682 | McCarthy | Apr. 8, 1913 |
| 2,853,389 | Luchese | Sept. 23, 1958 |
| 2,916,381 | Jumenko | Dec. 8, 1959 |

OTHER REFERENCES

"Everybody's Cook Book," 1924, by I. E. Lord, published by Henry Holt and Company, New York, page 128, article entitled, Stuffed Chicken Legs.